Oct. 28, 1958   R. REEBER   2,857,786
EMBROIDERY GEARING ATTACHMENT
Filed Sept. 10, 1956

INVENTOR
RUDOLF REEBER

BY Robert H. Jacob
AGENT

2,857,786

EMBROIDERY GEARING ATTACHMENT

Rudolf Reeber, Kaiserslautern, Pfalz, Germany, assignor to G. M. Pfaff A.-G., Kaiserslautern, Pfalz, Germany Application September 10, 1956, Serial No. 608,916

Claims priority, application Germany September 13, 1955

2 Claims. (Cl. 74—812)

The invention relates to sewing machines, particularly to an embroidery gearing device for sewing machines.

More in particular, the invention provides an embroidery gearing attachment for sewing machines which is adapted to transmit minor forces and which is rendered inoperative in one direction by the use of a free wheeling ball bearing arrangement and which is cut in automatically in the other direction of rotation of the motor.

In accordance with the invention the gearing and the free wheeling bearings are arranged in a gear housing which is designed in the form of a bearing pulley. For this purpose the gearing which constitutes a unit with the pulley is mounted upon the shaft of the motor.

Reliable transmission of forces, although not completely slip-proof, is attained in that the wall thickness of the pulley and the pressure of the rollers are so proportioned with respect to one another that the wall of the pulley is elastically deformed in a manner that the operation of the belt is not affected.

It is an object of the invention to provide an embroidery gearing attachment for sewing machines which is especially simple in construction and designed in a manner that it can be readily attached to any motor.

It is another object of the invention to retain the original overall length of the power assembly which comprises a motor and a pulley so that the unit can be exchanged with one provided with a gearing device.

It is still a further object of the invention to provide an embroidery gearing attachment which provides for substantially slip proof operation by proportioning the wall thickness of the pulley and the rollers in a manner to complement one another.

Figure 1:
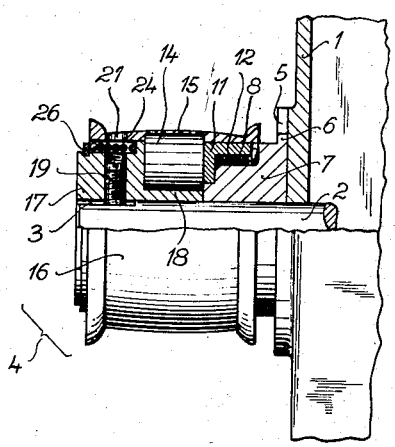
Figure 2:
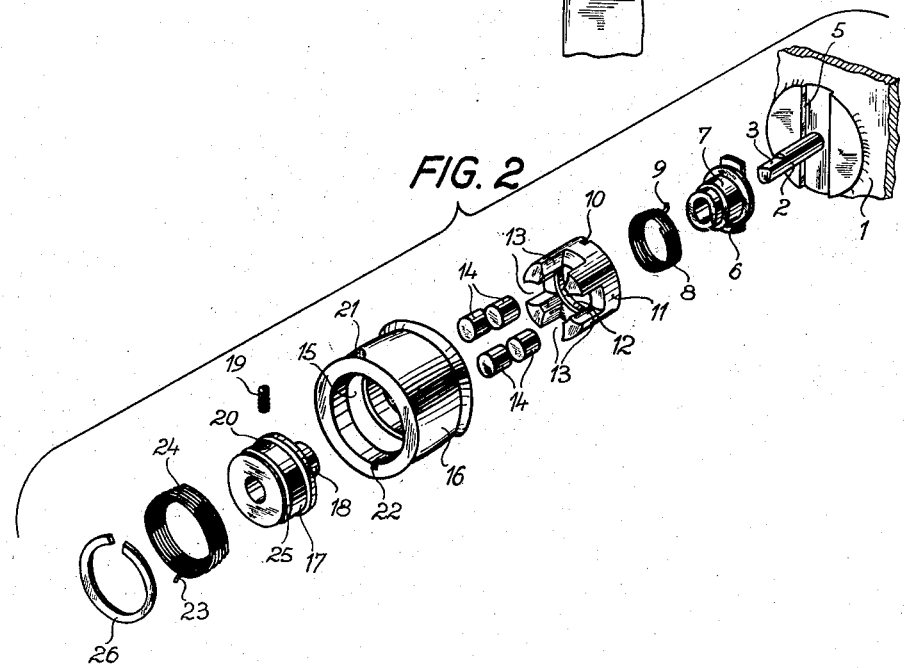

Other objects and advantages of the invention will become apparent from the following description and with reference to the drawings in which Fig. 1 is a view in side elevation, partly in section of the front end of a motor with the embroidery gearing attachment, and Fig. 2 is a perspective view showing the individual parts of the embroidery gearing attachment in exploded form.

The drawing shows only the drive end of the motor with the support plate 1 and the shaft 2. The shaft 2 is provided with a flattened portion 3 for securing the gearing 4 to the end thereof. The support plate 1 is provided with a milled groove 5 to receive a projecting portion in the form of a bar 6 which is provided on a sleeve 7. The shaft 2 can rotate freely in the sleeve 7 which has a sufficiently large inner diameter. A free motion spring 8 having a plurality of turns is provided around sleeve 7. One end 9 of the spring 8 is turned up and seated in a slot 10 of the roller cage 11 which is preferably made of a sintered material.

The free motion spring 8 and the sleeve 7 are disposed with tolerance in an annular recess 12 of the roller cage 11. Four friction rollers 14 are rotatably disposed in recesses 13 of the cage 11 and shoulder against an annular groove of a belt pulley 16 which is in the form of a gear housing and against a hub 18 provided in the clutch ring 17. The clutch ring 17 is secured to the shaft 2 of the motor by means of a screw 19 which is threaded into a bore 20 of ring 17. In the assembled condition of the gearing device screw 19 is accessible by way of a bore 21 of the pulley 16. Furthermore the pulley 16 is provided with a slot 22 in which the end 23 of a further free motion spring 24 is fixed which spring is disposed upon clutch ring 17. Spring 24 is securely held by a lock ring 26 which is mounted in an annular groove of the clutch ring 17.

In operation, as the motor shaft 2 rotates counterclockwise as viewed in Fig. 2, the clutch ring 17 which is fastened to shaft 2 rotates in the same direction. As a result spring 24 is wound tightly on the clutch ring 17 and the belt pulley 16 is carried along by the end 23 of the spring at the same rate of speed. Inasmuch as the hub 18 and the pulley 16 now move at the same speed, rollers 14, roller cage 11 and spring 8 are carried along because spring 8 is raised from its seat during rotation in this direction.

If the direction of rotation of the motor is reversed by reversing the associated leads in a manner that the shaft 2 rotates clockwise, then spring 24 moves freely upon the clutch ring 17. It is seen that for this direction of rotation there is no coupling between the clutch ring 17 and belt pulley 16, but the rollers 14 unwind on the hub 18 and tend to move likewise in the clockwise direction. However, the roller cage 11 prevents this because it is detained by the free motion spring 8 which is tightened upon the sleeve 7 during rotation in this direction. Thus the pulley 16 is forced to move again counterclockwise as it did before. However, due to the reduction effect of the rollers, this rotation takes place at reduced speed.

The belt pulley which constitutes the outer ring for the rollers has a relatively small wall thickness so that the outer ring encompasses the rollers in the manner of a spring and presses them against the hub, thereby providing for the necessary frictional engagement.

Having now particularly described the invention with reference to the embodiment illustrated I do not wish to be limited thereto but what I claim is set forth in the appended claims.

I claim:

1. Embroidery gearing device for a sewing machine having a motor including a shaft extending therefrom and drivingly supporting said gearing device, said gearing device comprising a belt pulley and free wheeling operating members adapted to disconnect said pulley from direct operative engagement with said shaft for one direction of rotation of said motor and to automatically connect said pulley for direct operation by said shaft for the other direction of operation of said motor, said belt pulley constituting a housing, said free wheeling operating members being disposed in said housing, said operating members including a stationary sleeve mounted adjacent the end plate of the motor, a first spring disposed around said sleeve, a roller cage around a portion of said sleeve and connected to one end of said first spring, a plurality of rollers in said cage, a clutch ring rigidly secured to said shaft and a second spring disposed around said clutch ring and having one end in engagement with said belt pulley constituting said housing for direct transfer of rotational movement in one direction from said shaft by way of said clutch ring and said spring.

2. Embroidery gearing device for a sewing machine having a motor including a shaft extending therefrom and drivingly supporting said gearing device, said gearing device comprising a belt pulley and free wheeling operating members adapted to disconnect said pulley from direct operative engagement with said shaft for one direction of rotation of said motor and to automatically connect said pulley for direct operation by said shaft for the other direction of operation of said motor, said belt pulley constituting a housing, said free wheeling operating members being disposed in said housing, said operating members including a stationary sleeve mounted adjacent the end plate of the motor, a first spring disposed around said sleeve, a roller cage around a portion of said sleeve and connected to one end of said first spring, a plurality of rollers in said cage, a clutch ring rigidly secured to said shaft and a second spring disposed around said clutch ring and having one end in engagement with said belt pulley constituting said housing for direct transfer of rotational movement in one direction from said shaft by way of said clutch ring and said spring, said rollers operatively engaging said belt pulley and said belt pulley being thin walled to impart resiliency thereto.

References Cited in the file of this patent

UNITED STATES PATENTS 2,588,187     Weiser _____ Mar. 4, 1952